US012656222B2

(12) United States Patent
Reuther et al.

(10) Patent No.: US 12,656,222 B2
(45) Date of Patent: Jun. 16, 2026

(54) DETECTING MANIPULATION OF A SENSOR UNIT

(71) Applicant: Vitesco Technologies GmbH, Regensburg (DE)

(72) Inventors: Achim Reuther, Donaustauf (DE); Ludwig Schifferl, Pentling (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 336 days.

(21) Appl. No.: 18/262,758

(22) PCT Filed: Feb. 2, 2022

(86) PCT No.: PCT/EP2022/052491
§ 371 (c)(1),
(2) Date: Jul. 25, 2023

(87) PCT Pub. No.: WO2022/171504
PCT Pub. Date: Aug. 18, 2022

(65) Prior Publication Data
US 2024/0410788 A1 Dec. 12, 2024

(30) Foreign Application Priority Data
Feb. 12, 2021 (DE) ..................... 10 2021 201 325.2

(51) Int. Cl.
*G01M 15/10* (2006.01)

(52) U.S. Cl.
CPC ................................. *G01M 15/102* (2013.01)

(58) Field of Classification Search
CPC .............................. G01M 15/102; G01D 21/00
See application file for complete search history.

(56) References Cited

U.S. PATENT DOCUMENTS

| | | | |
|---|---|---|---|
| 6,366,208 B1 | 4/2002 | Hopkins | 340/650 |
| 6,518,880 B2 | 2/2003 | Tanizawa | 340/514 |
| 8,650,942 B2 | 2/2014 | Klenk et al. | 73/114.69 |

(Continued)

FOREIGN PATENT DOCUMENTS

| | | | |
|---|---|---|---|
| CN | 111044684 A | 4/2020 | G01N 33/00 |
| DE | 10131229 A1 | 4/2002 | G01D 3/08 |

(Continued)

OTHER PUBLICATIONS

Search Report for International Application No. PCT/EP2022/052491, 5 pages, May 13, 2022.

*Primary Examiner* — Timothy P Graves
(74) *Attorney, Agent, or Firm* — Slayden Grubert Beard PLLC

(57) ABSTRACT

Various embodiments of the teachings herein include a method for detecting manipulation of a sensor including a measuring unit to measure a physical property and a control unit connected to the measuring unit to receive measurement signals from the measuring unit and to send control signals to the measuring unit. The method may include: sending a predetermined diagnostic signal to the measuring unit using the control unit; receiving a response signal generated by the measuring unit in response to the predetermined diagnostic signal; and identifying manipulation of the sensor unit if the response signal received deviates from a predetermined reference signal by more than a threshold value.

6 Claims, 1 Drawing Sheet

(56) References Cited

U.S. PATENT DOCUMENTS

| | | | | |
|---|---|---|---|---|
| 10,127,409 B1 * | 11/2018 | Wade | ...................... | G06F 21/75 |
| 2006/0218895 A1 | 10/2006 | Wickert | .......................... | 60/277 |
| 2008/0197856 A1 | 8/2008 | Schnaibel et al. | ............ | 324/549 |
| 2014/0028463 A1 | 1/2014 | Chamarti et al. | ........ | 340/870.02 |

FOREIGN PATENT DOCUMENTS

| | | | | |
|---|---|---|---|---|
| DE | 102004031625 A1 | 2/2006 | ........... | G01N 27/407 |
| DE | 102011002502 A1 | 2/2012 | ............. | F01P 11/00 |
| DE | 10 2010 042 748 | 4/2012 | ................ | B60L 3/00 |
| EP | 3 222 833 | 9/2017 | .............. | F01N 3/20 |
| EP | 3581894 A1 | 12/2019 | ............ | G01D 21/00 |
| JP | 2011024354 A | 2/2011 | ................ | H02P 9/04 |
| KR | 101592776 | 2/2016 | ........... | G01M 15/10 |

* cited by examiner

DETECTING MANIPULATION OF A SENSOR UNIT

CROSS-REFERENCE TO RELATED APPLICATIONS

This application is a U.S. National Stage Application of International Application No. PCT/EP2022/052491 filed Feb. 2, 2022, which designates the United States of America, and claims priority to DE Application No. 10 2021 201 325.2 filed Feb. 12, 2021, the contents of which are hereby incorporated by reference in their entirety.

TECHNICAL FIELD

The present disclosure relates to sensors. Various embodiments include systems and/or methods for detecting manipulation of a sensor unit, e.g. a sensor unit for an internal combustion engine of a vehicle.

BACKGROUND

Sensor units usually comprise a measuring unit measuring a physical property and generating an electrical signal indicating the physical property, such as a current signal, voltage signal or resistance signal, and a control unit connected to the measuring unit, which is designed to receive and process the measurement signals generated by the measuring unit and to send control signals to the measuring unit. The sensor unit, in turn, can be connected to a control device which further processes the sensor signals prepared by the sensor unit.

Sometimes, however, sensor manipulations occur in which, for example, the original measuring unit is replaced by a different measuring unit which may not always have the measurement accuracy of the original measuring unit. The original measuring unit is also frequently replaced by an electrical component, which, however, only provides satisfactory measurement signals but does not indicate the physical property to be measured. Such manipulations must be identified, as they also manipulate and falsify the measuring signal.

Document EP 3 581 894 A1 discloses a method, a device and a system for detecting an attempted manipulation of a sensor of a vehicle. In this solution, a first measurement signal is read in, which is representative of a measured value of the first measured variable detected with the sensor. It is also determined whether the first measuring signal is outside a specified useful range. If it is determined that the first measuring signal is outside a specified useful range, an output signal is issued, which is representative of a manipulation attempt.

Document JP 2011-024354 A describes a control procedure for a motor generator. In particular, it is designed to detect whether a rotation speed sensor is connected to the ECU or not. This identifies an interruption in the connection when a detection signal can no longer be received from the speed sensor. In addition, it is disclosed that a connection interruption is detected when the ECU receives a pulse signal from the rotation speed sensor that is not a continuous signal at predetermined intervals.

Document US 2014 0028463 A1 discloses a system and a method for identifying the replacement of a sensor. In this case the absence or interruption of a connection of a current sensor from a controller can be determined by means of the raw data of the applied input voltage, which due to the error may be random or irregular.

Document CN 111 044 684 A shows an aging detection system for an NOx sensor. The NOx sensor signal is compared to a reference signal during predetermined operating conditions and, in the event of a deviation, aging of the sensor is inferred.

SUMMARY

The teachings of the present disclosure may be used to detect manipulation, such as a replacement of the original measuring unit, of a sensor unit in a reliable manner and to issue a corresponding warning. For example, some embodiments of the teachings herein include a method for detecting manipulation of a sensor unit (100), which consists of a measuring unit (110), which is designed to measure a physical property, and a control unit (120) connected to the measuring unit (110), which is designed to receive measurement signals from the measuring unit (110) and to send control signals to the measuring unit (110), wherein the method comprises: sending at least one predetermined diagnostic signal to the measuring unit (110) by means of the control unit (120), receiving at the control unit (120) a response signal generated by the measuring unit (110) in response to the predetermined diagnostic signal, and detecting manipulation of the sensor unit (100) if the response signal received deviates from a predetermined reference signal by more than a threshold value.

In some embodiments, the method is carried out every time the sensor unit (100) is put into operation.

In some embodiments, the predetermined diagnostic signal is one or more Dirac-type current pulses or an impedance measurement of electrodes of the measuring unit (110).

In some embodiments, the sensor unit (100) is designed to be deployed in an aircraft, a land vehicle, a rail vehicle, a watercraft, or a building.

In some embodiments, the sensor unit (100) is designed to be deployed in an electric vehicle, a hybrid vehicle, or a vehicle with an internal combustion engine.

In some embodiments, the sensor unit (100) is an exhaust gas sensor for detecting the nitrogen oxide and/or ammonia concentration in the exhaust gas tract of the internal combustion engine of the vehicle, wherein the measuring unit (110) has a ceramic-based sensor element.

In some embodiments, the method further comprises issuing a warning indicating manipulation of the sensor unit (100) when manipulation of the sensor unit (100) has been detected.

BRIEF DESCRIPTION OF THE DRAWINGS

Further objects and features of the teachings of the present disclosure are apparent to a person skilled in the art by putting the present teaching into practice and taking into consideration the accompanying drawings, in which.

DETAILED DESCRIPTION

Figure 1:
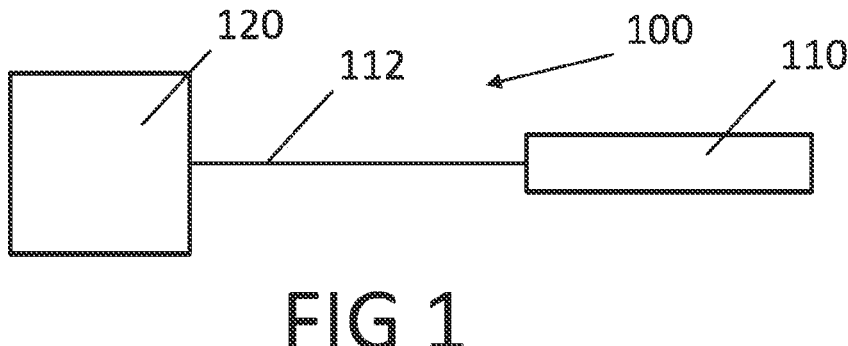
FIG. 1 shows a diagrammatic view of a sensor unit incorporating teachings of the present disclosure.

Various embodiments of the teachings of the present disclosure include detecting manipulation of a sensor unit, in particular of a measuring unit of the sensor unit, by a control unit of the sensor unit storing a physical fingerprint of the measuring unit and querying it regularly or on demand, such as upon each restart of the sensor unit. For example, for this purpose the control unit can query a diagnostic signal from the measuring unit, for example in the form of sending a predetermined diagnostic signal and receiving an expected response signal by the measuring unit. If the response signal generated in response to the diagnostic signal does not meet expectations, manipulation of the measuring unit can be assumed, for example, an unauthorized replacement of the measuring unit.

Some embodiments include a method for detecting manipulation of a sensor unit which consists of a measuring unit which is designed to measure a physical property, and a control unit connected to the measuring unit, which is designed to receive measurement signals from the measuring unit and to send control signals to the measuring unit. The example method comprises sending at least one predetermined diagnostic signal to the measuring unit by means of the control unit, receiving at the control unit a response signal generated by the measuring unit in response to the predetermined diagnostic signal, and detecting manipulation of the sensor unit if the response signal received by the control unit deviates from a predetermined reference signal by more than a predetermined threshold value.

In the comparison of the received response signal with the predetermined reference signal, two signal waveforms are examined over time, wherein a deviation by more than the predetermined threshold value exists if at least one temporally discrete value or a variable of the response signal derived from the temporal curve deviates from the predetermined threshold value to be expected from the temporal waveform of the reference signal.

Manipulation of the sensor unit, in particular of the measuring unit, can be detected from the fact that the received response signal that is generated in response to the sending of the predetermined diagnostic signal does not match a predetermined expected reference signal, or deviates from it by more than the threshold value. If this is the case, manipulation of the sensor unit can be reliably detected.

In some embodiments, the method is carried out each time the sensor unit is put into operation. This means that before the actual measurement, it can be checked whether or not the sensor unit has been manipulated in the meantime, i.e. since the last time it was put into operation.

In some embodiments, the predetermined diagnostic signal is one or more Dirac-type current pulses or an impedance measurement of electrodes of the measuring unit. In some embodiments, the predetermined diagnostic signal is as short an excitation as possible with a defined bandwidth and amplitude, which forces the system to produce a response signal with frequency and amplitude. This response signal is then compared to a predetermined reference signal by the control unit. A potential advantage of the Dirac-type diagnostic signal is the high information content of the response signal due to the broadband excitation.

In some embodiments, the sensor unit is designed to be deployed in an aircraft, a land vehicle, a rail vehicle, a watercraft, or a building.

In some embodiments, the sensor unit is selected to be deployed in an electric vehicle, a hybrid vehicle, or a vehicle with an internal combustion engine. In particular, the sensor unit is an exhaust gas sensor for detecting the nitrogen oxide and/or ammonia concentration in the exhaust tract of the internal combustion engine of the vehicle, wherein the measuring unit has a ceramic-based sensor element, such as an yttrium-stabilized zirconium oxide.

In some embodiments, the yttrium-stabilized zirconium oxide together with the electronics mounted thereon forms the measuring unit of the sensor unit in the sense of the present invention. The sensor control unit (SCU), which is electrically connected to the measuring unit, forms the control unit of the sensor unit in the sense of the present invention.

In some embodiments, the method further comprises issuing a warning indicating manipulation of the sensor unit if manipulation of the sensor unit has been detected.

FIG. 1 shows a schematic view of an example sensor unit 100 incorporating teachings of the present disclosure. The sensor unit 100 of FIG. 1 consists of a measuring unit 110, which is connected to a control unit 120 by means of an electrical connecting cable 112. By means of the electrical connecting cable 112, the control unit 110 can send control signals to the measuring unit 110 and the measuring unit 110 can in turn transmit measurement signals via the electrical connecting cable 112 to the control unit 110 for further processing.

Figure 2:
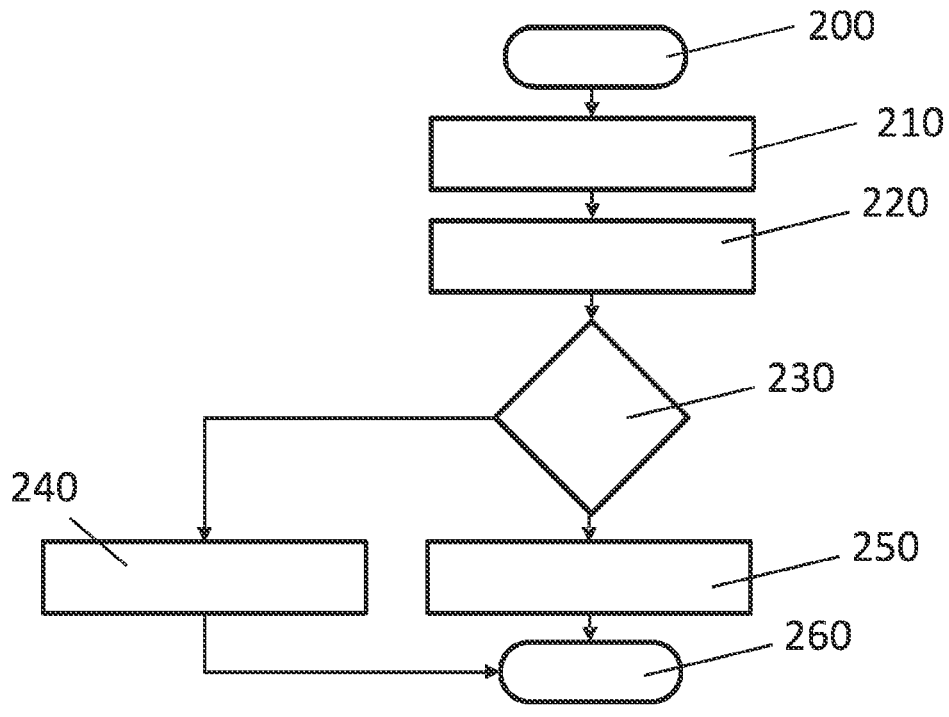
FIG. 2 shows a flow diagram of an example method incorporating teachings of the present disclosure for detecting manipulation of the sensor unit of FIG. 1.

FIG. 2 shows a flow diagram of an example method incorporating teachings of the present disclosure for detecting manipulation of the sensor unit 100 of FIG. 1. In particular, the method can be used to detect a replacement of the measuring unit 110 of the sensor unit 100 of FIG. 1 by another measuring unit.

The method of FIG. 2 starts at step 200 and then proceeds to step 210, in which the control unit 120 sends at least one predetermined diagnostic signal to the measuring unit 110 by means of the connecting cable 112. In a subsequent step 220, the measuring unit 110 generates a response signal in response to the predetermined diagnostic signal and transmits this to the control unit 120, which receives this response signal.

In a subsequent step 230, it is checked whether the received response signal deviates from a predetermined reference signal by more than a threshold value. If it is determined in step 230 that the received response signal deviates from the predetermined reference signal by more than the threshold value, the method proceeds to step 240, at which manipulation of the sensor unit 100 is detected, before the method ends at step 260.

If, however, it is determined in step 230 that the received response signal deviates from the predetermined reference signal by more than the threshold value, the method proceeds to step 250, at which a properly functioning sensor unit 100 is diagnosed, before the method ends again at step 260.

The predetermined diagnostic signal sent by the control unit 120 may preferably be one or more Dirac-type current pulses, which, in the case of a properly functioning measuring unit 110, would give rise to a known and expected response signal that should match a predetermined reference signal. Thus, the comparison of the received response signal with the expected response or reference signal can be used to detect a manipulation. The threshold value can be a measurement value or a signal waveform.

What is claimed is:

1. A method for detecting manipulation of a sensor including a measuring unit to measure a physical property and a control unit connected to the measuring unit to receive measurement signals from the measuring unit and to send control signals to the measuring unit, the method comprising:

sending a predetermined diagnostic signal to the measuring unit using the control unit;

receiving a response signal generated by the measuring unit in response to the predetermined diagnostic signal; and identifying manipulation of the sensor if the response signal received deviates from a predetermined reference signal by more than a threshold value;

wherein the sensor comprises an exhaust gas sensor for detecting the nitrogen oxide and/or ammonia concentration in the exhaust gas tract of the internal combustion engine of a vehicle; and the sensor comprises a ceramic-based sensor element.

2. The method as claimed in claim 1, further comprising repeating the method every time the sensor is put into operation.

3. The method as claimed in claim 1, wherein the predetermined diagnostic signal comprises a Dirac-type current pulses or an impedance measurement of electrodes of the measuring unit.

4. The method as claimed in claim 1, wherein the sensor is deployed in an aircraft, a land vehicle, a rail vehicle, a watercraft.

5. The method as claimed in claim 1, wherein the sensor is deployed in a hybrid vehicle with an internal combustion engine.

6. The method as claimed in claim 1, further comprising issuing a warning indicating manipulation of the sensor in response to detecting manipulation of the sensor.

* * * * *